US012023854B2

United States Patent
Natale et al.

(10) Patent No.: US 12,023,854 B2
(45) Date of Patent: Jul. 2, 2024

(54) METHOD AND APPARATUS FOR THE CONSTRUCTION OF THREE-DIMENSIONAL FIBRE-REINFORCED STRUCTURES FROM A PRE-EXISTING OBJECT

(71) Applicant: MOI COMPOSITES S.R.L., Milan (IT)

(72) Inventors: Gabriele Natale, Como (IT); Michele Tonizzo, Como (IT); Giuseppe Garabelli, Como (IT); Davide Matteo Ricci, Corno (IT)

(73) Assignee: MOI COMPOSITES S.R.L., Milan (IT)

( * ) Notice: Subject to any disclaimer, the term of this patent is extended or adjusted under 35 U.S.C. 154(b) by 311 days.

(21) Appl. No.: 17/595,986

(22) PCT Filed: Jun. 5, 2020

(86) PCT No.: PCT/IB2020/055294
§ 371 (c)(1),
(2) Date: Dec. 1, 2021

(87) PCT Pub. No.: WO2020/245774
PCT Pub. Date: Dec. 10, 2020

(65) Prior Publication Data
US 2022/0324159 A1 Oct. 13, 2022

(30) Foreign Application Priority Data
Jun. 7, 2019 (IT) .......................... 102019000008343

(51) Int. Cl.
B29C 64/386 (2017.01)
B29C 64/118 (2017.01)
(Continued)

(52) U.S. Cl.
CPC .......... B29C 64/118 (2017.08); B29C 64/209 (2017.08); B29C 64/393 (2017.08);
(Continued)

(58) Field of Classification Search
CPC ... B29C 64/106; B29C 64/118; B29C 64/209; B29C 64/386; B29C 64/393;
(Continued)

(56) References Cited

U.S. PATENT DOCUMENTS

2014/0291886 A1* 10/2014 Mark .................... B29C 70/384
264/259
2015/0294030 A1 10/2015 Cudak et al.
(Continued)

FOREIGN PATENT DOCUMENTS

| EP | 3210757 A1 | 9/2019 |
| WO | 2018019644 A1 | 2/2018 |

OTHER PUBLICATIONS

International Search Report and Written Opinion issued in PCT application No. PCT/IB2020/055294, mailing date Aug. 31, 2020.
(Continued)

*Primary Examiner* — Leo B Tentoni

(57) ABSTRACT

A method for the construction of three-dimensional fibre-reinforced structures from a pre-existing object, where said method comprises the following steps: —acquisition of the initial three-dimensional geometry of the pre-existing object and of the relative spatial coordinates of its position with respect to a numerically controlled machine (10) equipped with at least one printhead (12); definition of the path to be followed by the above-mentioned printhead (12) in order to add the desired amount of material to the pre-existing object to obtain a desired final object; —deposit of the material on the pre-existing object by means of said printhead (12) by layering the composite material on the pre-existing object
(Continued)

according to programmed trajectories, where such programmed trajectories are calculated according to the path that said printhead (12) must follow to add the desired amount of material to the pre-existing object; —extraction of the reinforced object after operations are concluded.

15 Claims, 4 Drawing Sheets

(51) Int. Cl.
| | | |
|---|---|---|
| *B29C 64/209* | (2017.01) | |
| *B29C 64/393* | (2017.01) | |
| *B29C 70/38* | (2006.01) | |
| *B29C 70/68* | (2006.01) | |
| *B29C 71/02* | (2006.01) | |
| *B33Y 10/00* | (2015.01) | |
| *B33Y 30/00* | (2015.01) | |
| *B33Y 40/20* | (2020.01) | |
| *B33Y 50/00* | (2015.01) | |
| *B33Y 50/02* | (2015.01) | |

(52) U.S. Cl.
CPC ......... *B29C 70/382* (2013.01); *B29C 70/384* (2013.01); *B29C 70/681* (2013.01); *B33Y 10/00* (2014.12); *B33Y 30/00* (2014.12); *B33Y 50/02* (2014.12); *B29C 70/386* (2013.01); *B29C 70/388* (2013.01)

(58) Field of Classification Search
CPC ..... B29C 70/38; B29C 70/382; B29C 70/384; B29C 70/386; B29C 70/388; B29C 70/68; B29C 70/681; B29C 71/02; B33Y 10/00; B33Y 30/00; B33Y 40/20; B33Y 50/00; B33Y 50/02
USPC ....... 264/40.1, 236, 257, 308, 334; 425/135, 425/375
See application file for complete search history.

(56) References Cited

U.S. PATENT DOCUMENTS

| | | |
|---|---|---|
| 2018/0126720 A1 | 5/2018 | Tyler et al. |
| 2019/0152160 A1 | 5/2019 | Tobin et al. |
| 2019/0270239 A1* | 9/2019 | Stubler ................ B29C 64/106 |

OTHER PUBLICATIONS

Office Action issued by the EPO on Nov. 6, 2023 for corresponding EP application No. 20742918.4.

* cited by examiner

METHOD AND APPARATUS FOR THE CONSTRUCTION OF THREE-DIMENSIONAL FIBRE-REINFORCED STRUCTURES FROM A PRE-EXISTING OBJECT

FIELD OF THE INVENTION

The present invention refers to a method and an apparatus for the construction of three-dimensional fibre-reinforced structures from a pre-existing object.

PRIOR ART

Various techniques are known for constructing objects using three-dimensional printing, generally referred to as Additive Manufacturing or 3D Printing processes.

With the expression 3D printing it is intended the realization of three-dimensional objects through additive production, starting from a digital three-dimensional model of the object to be obtained. The digital model is generally produced by means of dedicated software and then processed to be realized with different technologies, for example the construction of prototypes layer after layer, or by means of different processes.

Processes of this type are part of a wide category of processes, among which can be mentioned for example filament winding, namely a processing method by winding that is mainly used in the production of hollow circular composite products. Filament winding consists in the use of a rotating preform around which, for example, resin impregnated fabric fibres are wound. The result of the processing is a low-cost product with high structural rigidity.

Another known method is called automatic fibre positioning (AFP), a method used in the production of composite materials. These materials, which offer a lower weight with equivalent or higher strength with respect to metals, are increasingly used in cells and other industrial products.

Machines using AFP technology place fibre reinforcements on moulds or mandrels automatically and use a series of separate small width drives (typically 8 mm or less) of pre-impregnated thermosetting or thermoplastics materials to form stratifications of composites.

This technology enables high accuracy and deposition rates and can be used to create complex structures.

However, the technologies described in Additive Manufacturing are generally designed and used to make products or prototypes from scratch.

In addition, the product or prototype made with such technologies is generally made of a single material.

A purpose of the present invention is therefore to solve the above mentioned problems, by means of a method and an apparatus that allows to reinforce a pre-existing object by adding additional structures, wherein said structures can be realized by controlled processes of material deposition on the pre-existing object.

A further aim of the invention is to provide a practical and economic solution to the above-mentioned problems.

These aims are achieved by a method for the construction of three-dimensional fibre-reinforced structures staring from a pre-existing object, wherein the method comprises the following steps:

acquisition of the initial three-dimensional geometry of the pre-existing object and of the relative spatial coordinates of its position with respect to a numerically controlled machine equipped with at least one printhead;

definition of the path that the above-mentioned printhead must follow in order to add the desired amount of material to the pre-existing object to obtain a desired final object;

deposit of the material on the pre-existing object by means of said printhead by layering the composite material on the pre-existing object according to programmed trajectories, wherein said programmed trajectories are calculated according to the path that said printhead must follow in order to add the desired quantity of material to the pre-existing object;

extraction of the reinforced object after operations are concluded.

Among the advantages of this embodiment is that it is possible to start from an object or a surface having a complex shape and create three-dimensional reinforcement structures on it.

In addition, by virtue of the invention, it is possible to incorporate inserts or components previously built with other materials or other technologies.

According to one aspect of the invention, the depositing phase of the material by means of the printhead that stratifies the composite material according to programmed trajectories takes advantage of the possibility of directing the material in a complex way by virtue of the polymerization or fixing of the fibres in space in an instantaneous way.

The invention also has significant advantages over filament winding technologies or automatic fibre deposition systems (AFP).

For example, instantaneous polymerization of fibers allows them to be directed according to very complex geometries, including concave or convex surfaces, sharp-edged surfaces, undercuts, and more.

In addition, instant polymerization allows you to create ribs or three-dimensional reinforcement features.

Finally, instant polymerization allows to deposit the fibres defining a very complex pattern and not only lenghtwise or straight.

The invention has as its object an apparatus for the construction of three-dimensional fibre-reinforced structures starting from a pre-existing object, wherein said apparatus includes a numerically controlled machine, said machine carrying a printhead, wherein said printhead is configured to apply in a stratified or additive way a composite material on said pre-existing object and wherein said printhead can be directed on at least three mutually perpendicular axes of movement.

The invention also has as object a printhead configured to operate in association with an apparatus for the construction of three-dimensional fibre-reinforced structures starting from a pre-existing object as in the previous claim, wherein said printhead is configured to apply in a stratified or additive way a composite material on said pre-existing object and where said printhead can be directed on at least three mutually perpendicular axes of movement.

The invention has as its further object a path planning system to be imposed on the machine and its printhead that is able to start from a CAD model of the pre-existing object.

Further features of the invention can be inferred from the dependent claims.

BRIEF DESCRIPTION OF THE DRAWINGS

Further features and advantages of the invention will be evident from reading the following description provided by way of non limitative example, with the help of the figures illustrated in the attached tables, in which.

This invention will now be described with particular reference to the attached figures.

DETAILED DESCRIPTION OF EMBODIMENTS OF THE INVENTION

Figure 1:
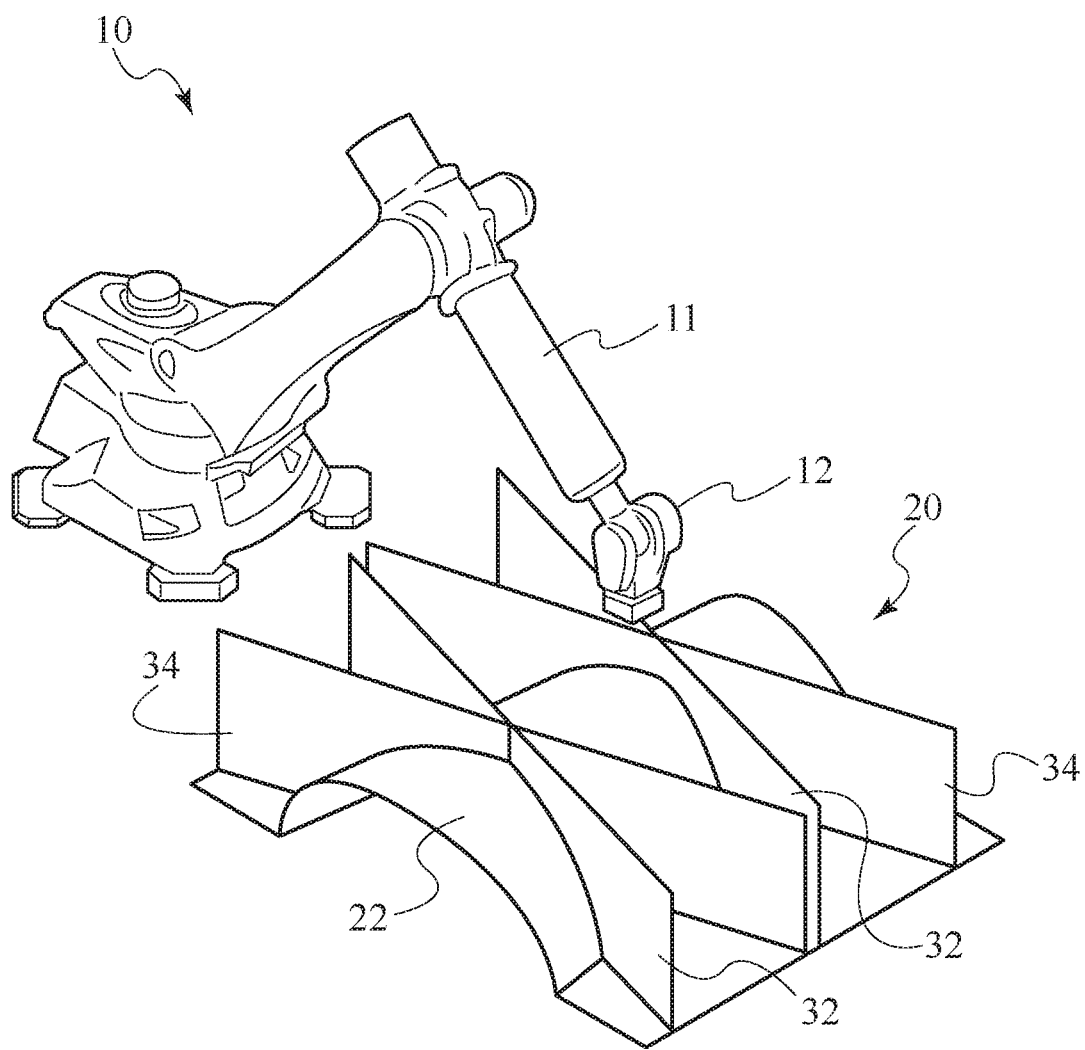
FIG. 1 illustrates an apparatus which performs a phase of the method of the present invention on a given pre-existing object.

In particular, in FIG. 1 a numerical controlled machine is visible, globally indicated with numerical reference 10, suitable to perform the method according to the various embodiments of the invention.

The machine 10 has the foam of an anthropomorphic robot equipped with a robot arm 11 that moves a deposition head or a 3D printhead 12 according to at least four, preferably six degrees of freedom. In turn, the printhead 12 is configured to deposit composite material in a layered manner according to programmed trajectories.

In particular, the printhead 12 is configured to deposit the composite material in a layered manner following the surfaces of the existing object 20, following the geometries of the existing object without compromising the integrity of the continuous filiform element. That is to say, without generating tension and shear stresses on the continuous filiform element.

The printhead 12 is advantageously supported by a handling unit for relative handling between the same feed head 12 and the pre-existing object 20.

The material used for layered deposition can be any material suitable for the purpose, for example a fibre-reinforced composite material that can polymerize quickly, preferably in a few seconds, forming fibres contained in a support matrix to be applied to an existing object or to successive layers of the same material.

In particular, the present invention lends itself to the printing of a composite material consisting of at least two elements, in particular at least one continuous fibre (or long fibre), which has the task of supporting the fillers; and a matrix, which holds together at least one fibre, protecting it from the external environment.

Generally there are several continuous or long fibres joined together to foam a continuous filiform element.

Other additives and reinforcements may also be present in the formed composite material.

A number of fibres, suitably joined together in a phase of making the filiform composite material, can be processed to foam a single body. The fibres can also be made of different materials, including for example glass fibre, carbon fibre, Kevlar fibre, basalt fibre, natural fibres, etc.

The fibres, which must be fed continuously, are preferably collected to form a continuous filiform element.

As far as the matrix is concerned, a resin in the liquid state is preferably used, in particular a thermosetting resin such as epoxy, acrylic, polyester etc., which can be cross-linked through the use of different stimuli brought to the system (light radiation, thermal energy, chemical stimuli such as contact between reactive components etc.).

Preferably, the continuous filiform element, which must be fed to the printing head 12 continuously, is collected on an element, such as a cylindrical spool around which the continuous filiform element itself is wound. Advantageously, the reel is unwound during the printing phases for continuous feeding of the continuous filiform element.

In particular, a station for making the composite material is provided for.

The station is arranged upstream of a printhead 12 of the composite material suitable for printing reinforcing elements on a pre-existing three-dimensional object as better explained below.

In greater detail, the station for making the composite material, in the form of a continuous filiform element, has at least one basin containing the aforementioned resin within which at least one fibre is drowned.

Advantageously, the continuously fed fiber, which is unwound from the respective reel, is passed through the basin. In this situation the fiber is completely drowned inside the resin.

The passage of the fibre into the resin therefore ensures the correct impregnation of the fibre, guaranteeing an even distribution of the resin over the respective fibre. In this respect, it should be specified that depending on the viscosity of the resin and on the structure of the fibre, a more or less long time can be predetermined for the fibre to remain in the basin.

Advantageously, for particularly viscous resins and/or for fibres made up of very compact filaments, a prolonged passage inside the basin is provided to ensure the correct (homogeneous) impregnation of the fibre with the resin.

In this regard, a plurality of basins can also be provided, arranged in series to implement a repeated passage of the fiber within each basin containing the resin, and/or resins also chemically different, useful for example for chemical activation through the use of two-component systems. Also this solution, not illustrated in the figures, is aimed at a greater and homogeneous impregnation of the fiber with the resin, as well as to the implementation of the versatility of production of composites with different and optimized matrices.

In FIG. 1 as an example, a pre-existing object 20 is visible schematically represented as a barrel vault 22 on which the machine 10, applying the method of the invention, applies a plurality of ribs or bracing 32, 34 to reinforce the pre-existing object 20.

The pre-existing starting 20 object on which to perform the additive processing according to a realization of the invention can be of any type and can be obtained with any production technology.

Figure 2:
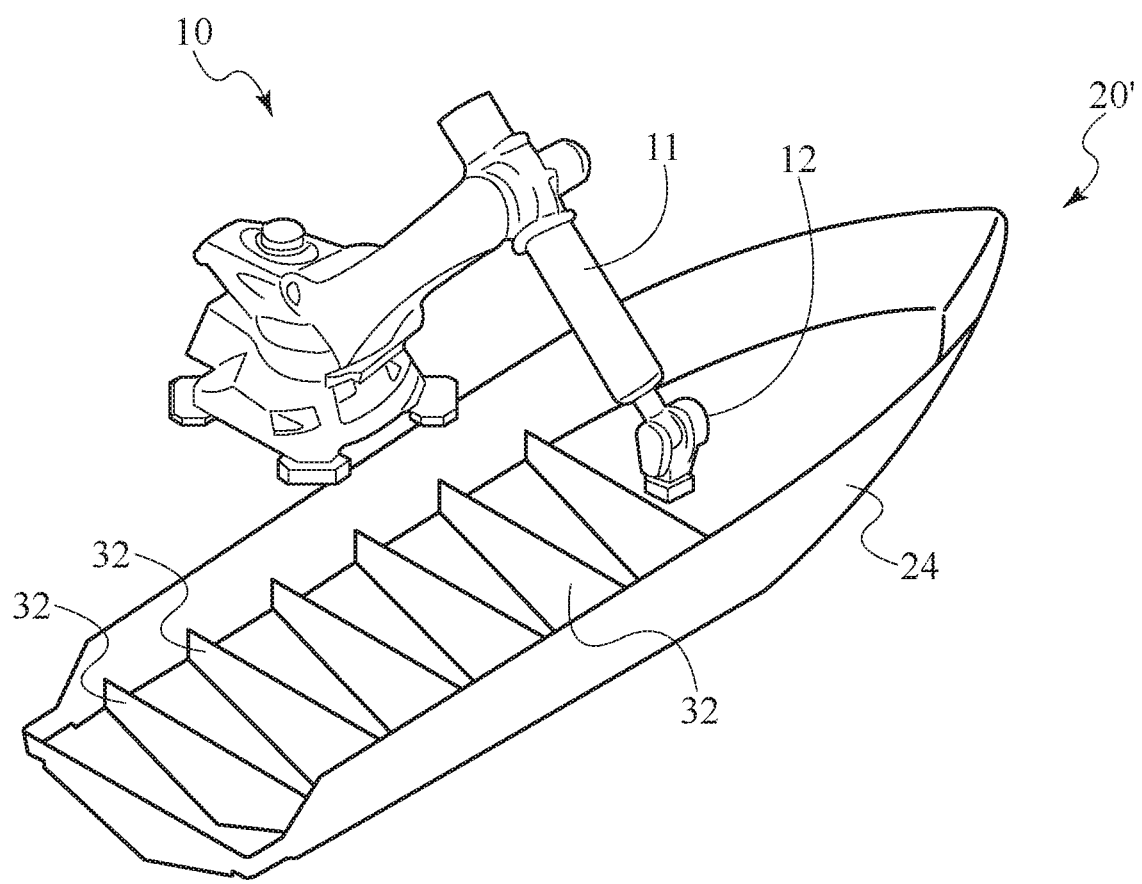
FIG. 2 illustrates an apparatus which performs a phase of the method of the present invention on another pre-existing object.

In FIG. 2 as a further example, a pre-existing object 20' schematically represented as a nautical vessel 24 on which the machine 10, applying the method of the invention, applies inside the hull of vessel 24 a plurality of ribs or bracings 32 reinforcing the pre-existing object 20'.

Figure 3:
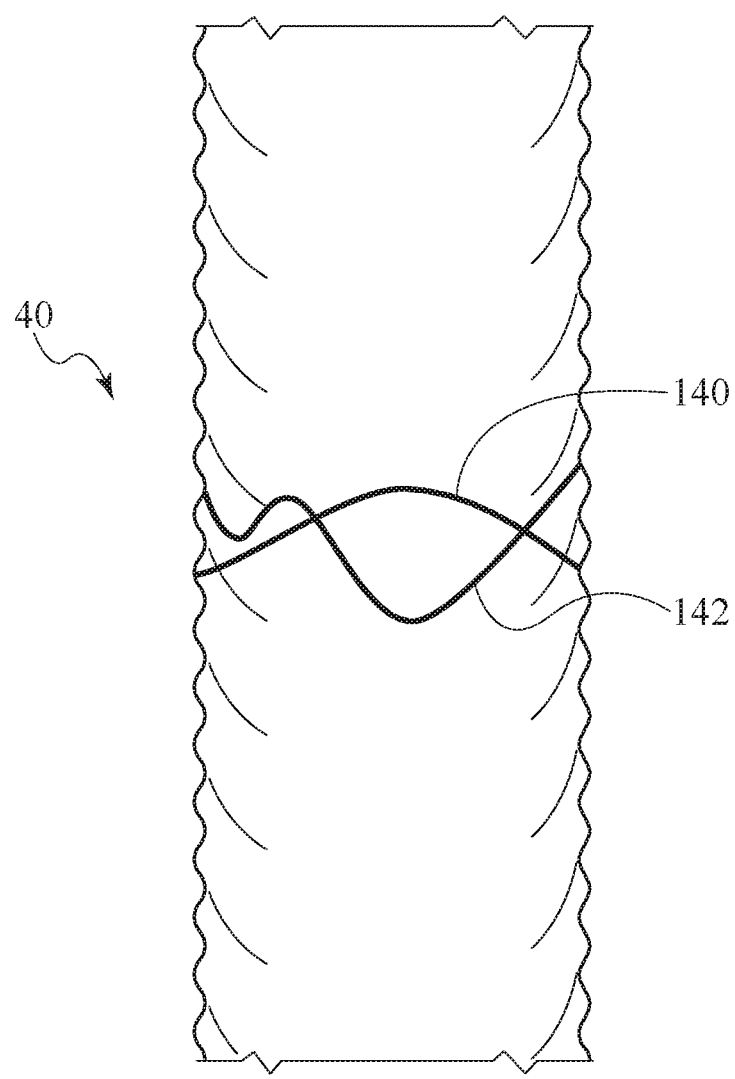
FIG. 3 illustrates an example of positioning a reinforcement according to an embodiment of the invention.

FIG. 3 shows an example of the positioning of a reinforcement element 40 according to a realization of the invention.

In this case, the reinforcing element 40 has a substantially tubular shape and is composed of a plurality of reinforcing fibres having polymer matrix 140, 142.

The pre-existing object 20 is produced at a time earlier than the time of implementation of the method according to the present invention.

The pre-existing object 20 is supplied at room temperature.

The pre-existing element 20 is supplied to be subjected to the deposition phase of the continuous filiform element on a support element, but does not require to be placed on moulds. In other words, the pre-existing element 20 is supplied without containment moulds.

As shown schematically in FIG. 3, the polymer matrix reinforcement fibers can be arranged according to layers that are not parallel to the deposition plane and according to complex trajectories.

Schematically, as also inferred from the above, an apparatus to implement the method according to the present invention includes:
- a numerical control machine 10, the machine 10 being equipped with at least one anthropomorphic robotic arm 11 carrying a printhead 12, mobile in at least four degrees of freedom, preferably six degrees of freedom, where said printhead 12 is configured to apply in a layered or additive manner a composite material to said pre-existing object and where said printhead 12 can be directed in at least four axes of motion;
- at least one source of energy, preferably thermal, configured to subject the continuous filiform element to thermal energy such as to induce a phase change from the solid liquid state to the liquid solid state of the continuous filiform element;
- at least one device configured to acquire the initial three-dimensional geometry of the pre-existing object 20 and the relative spatial coordinates of its position with respect to said CNC machine 10;
- at least one processing unit configured to define a path that said printhead 12 must follow in order to add the desired amount of material to the existing object to obtain a desired final object.

The apparatus also includes a station for making the composite material, as previously described.

Figure 4:
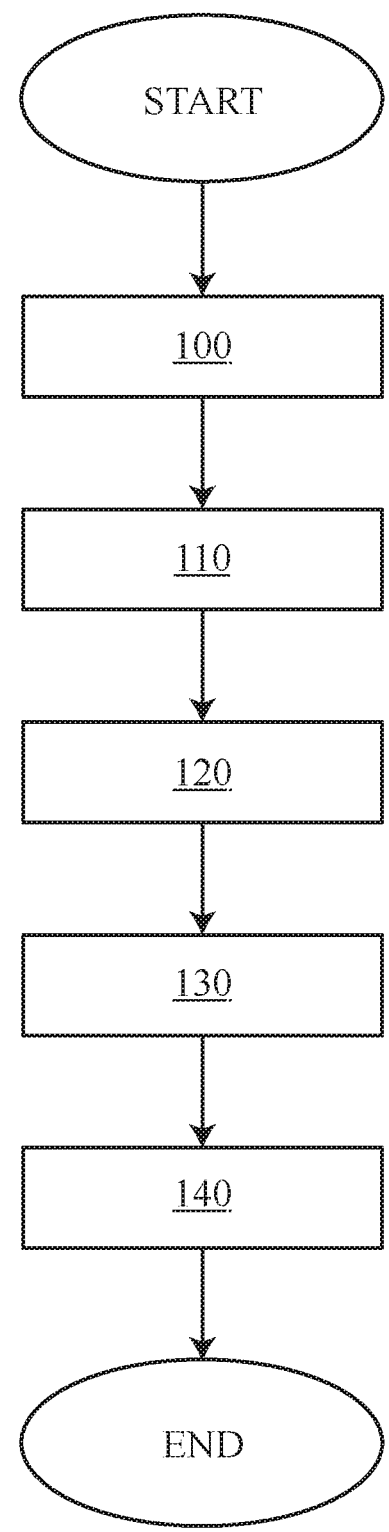
FIG. 4 shows a block diagram of the method according to an embodiment of the invention.

FIG. 4 shows a block diagram of the method according to a realization of the invention.

In general, therefore, according to an embodiment of the method of invention, the method starts from a pre-existing object, of which the initial three-dimensional geometry of the object itself has been initially acquired (block 100).

It is also necessary to acquire the spatial coordinates of the position of the object itself with respect to the numerically controlled machine 10 equipped with printhead 12 (block 110).

In particular, the acquisition phase of the three-dimensional starting geometry of the pre-existing object 20 takes place through the use of templates or guides. These templates or guides reproduce the pre-existing object and include markers configured to be detected by said machine.

Preferably, the acquisition phase of the three-dimensional starting geometry of the pre-existing object takes place by means of a three-dimensional scan of the pre-existing object on which to carry out the operation in order to acquire the mathematics and data related to positioning in space, wherein with the wording mathematics it is intended the digital file containing the dimensional information describing the geometry of the pre-existing object 20.

According to another realization of the invention, the acquisition phase of the three-dimensional starting geometry of the object takes place by means of mechanical devices that allow to follow the surfaces of the pre-existing object, namely before the deposition phase of the continuous filiform element.

At this point the sequences of operations involving the numerically controlled machine 10 are defined, namely the trajectories or path that the machine 10, and the printhead 12, must perform in order to add material to the starting object (block 120).

A continuous filiform element containing at least one continuous fibre is fed to the printhead 12.

When feeding the continuous filiform element to the printhead, the handling unit exerts a tensile force on the continuous filiform element and thus also on the continuous fibres it contains.

In other words, the relative movement between the printhead 12 and the pre-existing object 20 results in a tensile action on the material during the respective deposition.

As a result, this tensile force is also transferred to the continuous fibres.

Note that this tensile force causes the same continuous filiform element to be fed into the printhead 12.

As a result, the higher the relative speed, the faster the continuous thread element feeds (and therefore the shorter the time the continuous thread element will remain in the printhead 12).

The polymeric material is then deposited by means of the printhead 12 which stratifies the composite material according to the programmed trajectories (block 130).

The printhead moving along at least four axes follows the programmed trajectory.

Once the operation is completed, the reinforced object (block 140) can be extracted, namely it is removed.

The depositing phase of the material that takes place through the printhead 12 which stratifies the composite material according to programmed trajectories takes advantage of the possibility to direct the material in a complex way thanks to the movement of the printhead 12 according to at least three axes, preferably according to at least four axes.

The printhead is, in fact, supported by an anthropomorphic robotic arm with six degrees of freedom that allows the deposition head to move according to at least one three axes of movement, preferably according to at least four axes of movement.

The management of the printhead trajectories is carried out using appropriate software.

Once the filiform element has been placed on the pre-existing object, it is immediately polymerized, subjecting the continuous filiform element to a quantity of energy preferably thermal sufficient to induce a phase change from the solid liquid state to the liquid solid state of the continuous filiform element.

Obviously, the invention as described may be modified or improved for contingent or particular reasons, without departing from the scope of the invention as claimed below.

The invention claimed is:

1. A method for the construction of three-dimensional fibre-reinforced structures starting from a pre-existing object, wherein said method comprises the following steps:
   - providing a pre-existing object (20) irreversibly associated with three-dimensional fibre-reinforced structures, said pre-existing object supplied without a containment mould;
   - acquiring an initial three-dimensional geometry of the pre-existing object (20) and of relative spatial coordinates of its position relative to a numerical control machine (10) equipped with at least one printhead (12) disposed on an anthropomorphic robotic arm (11);
   - defining a path to be followed by said anthropomorphic robotic arm (11) and said at least one printhead (12) in order to add a desired amount of material to the pre-existing object (20) to obtain a desired final object;
   - feeding at least one continuous filiform element comprising at least one continuous fibre to one said printhead (12);

laying the continuous filiform element comprising at least one continuous fibre on the pre-existing object by means of said printhead (12) by layering a composite material on the pre-existing object according to programmed trajectories, wherein said programmed trajectories are calculated according to the path that said printhead (12) must take to add a desired quantity of material to the pre-existing object to thereby construct said three-dimensional fibre-reinforced structures associated with the pre-existing object (20), said printhead (12) moving along three mutually perpendicular axes of movement along the programmed trajectories;

subjecting said continuous filiform element to a quantity of energy such as to induce a phase change from a solid liquid state to a liquid solid state of the continuous filiform element; and extracting of the final object with the three-dimensional fibre-reinforced structures, after operations are concluded.

2. Method as in claim 1, in which said acquiring the initial three-dimensional geometry of the pre-existing object is achieved by positioning the pre-existing object (20) using templates or guides; said templates or guides reproducing the pre-existing object and including markers configured to be detected by said machine.

3. Method as in claim 1, in which said acquiring the initial three-dimensional geometry of the pre-existing object (20) is performed by scanning the pre-existing object (20) in order to acquire a digital file with dimensional information describing the geometry of the pre-existing object (20) and data related to its positioning in space.

4. Method as at claim 1, in which said acquiring the initial three-dimensional geometry of the pre-existing object takes place by means of mechanical devices that allow to follow surfaces of the pre-existing object (20) before the feeding the at least one continuous filiform element.

5. Method as in claim 1, in which the step of laying takes advantage of the possibility of directing the continuous filiform element in a complex way by virtue of the polymerization or of fixing of the fibres in space in an instantaneous way.

6. Method as in claim 1, in which said feeding and laying are implemented by exerting a traction force on the continuous filiform element by means of a relative movement between a respective printhead (12) and said pre-existing object.

7. Method as in claim 1, in which, during said providing a pre-existing object (20) irreversibly associated with three-dimensional fibre-reinforced structures, the pre-existing object (20) is at room temperature.

8. Method as in claim 1, in which said pre-existing object is produced at a distinct time prior to said laying the continuous filiform element comprising at least one continuous fibre.

9. An apparatus for the construction of three-dimensional fibre-reinforced structures from a pre-existing object (20), such apparatus comprising:

a numerical control machine (10) having at least one anthropomorphic robotic arm (11) carrying a printhead (12), wherein said printhead (12) is configured to apply in a layered or additive fashion a composite material to said pre-existing object supplied without containment moulds and wherein said printhead (12) is adjustable in at least three mutually perpendicular axes of motion;

a feeding element for feeding at least one continuous filiform element, comprising at least one continuous fibre, to said printhead (12);

at least one energy source configured to subject the continuous filiform element to energy such as to induce a phase change from a solid liquid state to a liquid solid state of the continuous filiform element;

at least one device configured to acquire an initial three-dimensional geometry of the pre-existing object (20) and relative spatial coordinates of its position with respect to said numerical control machine (10); and at least one processing unit configured to define a programmed trajectory path that said printhead (12) must follow in order to add the desired amount of material to the pre-existing object to obtain a desired final object, said anthropomorphic robotic arm (11) carrying said printhead such that said printhead is movable along three mutually perpendicular axes of movement along the programmed trajectory path.

10. The apparatus as in claim 9, in which wherein said arm includes an anthropomorphic robotic arm is capable of six degrees of freedom.

11. The apparatus as in claim 9, further comprising a collecting element that includes a spool around which a fibre is wound and a resin bath through which the fibre is passed to form the continuous filiform element fed to said printhead.

12. Method as in claim 1, wherein said continuous filiform element is a composite material and further comprising joining together a number of fibres in a phase to form the continuous filiform composite material.

13. Method as in claim 12, wherein said fibres comprise different materials.

14. Method as in claim 1, wherein said feeding at least one continuous filiform element comprising at least one continuous fibre to one said printhead, includes continuously feeding said continuous filiform element from a cylindrical spool and through a basin comprising a resin.

15. Method as in claim 1, wherein said laying comprises said three-dimensional fibre-reinforced structure including a polymeric matrix.

* * * * *